United States Patent
Samac et al.

(10) Patent No.: US 8,469,345 B2
(45) Date of Patent: Jun. 25, 2013

(54) AUTOMATED, ADJUSTABLE, MACHINE-TOOL WORK-PIECE-MOUNTING APPARATUS

(75) Inventors: Robert A. Samac, Cle Elum, WA (US); Richard J. Richings, Shoreline, WA (US); Kevin A. Hay, Des Moines, WA (US)

(73) Assignee: C D P Holdings, LLC, Seattle, WA (US)

( * ) Notice: Subject to any disclaimer, the term of this patent is extended or adjusted under 35 U.S.C. 154(b) by 310 days.

(21) Appl. No.: 12/839,201

(22) Filed: Jul. 19, 2010

(65) Prior Publication Data

US 2011/0018185 A1    Jan. 27, 2011

Related U.S. Application Data

(60) Provisional application No. 61/271,132, filed on Jul. 17, 2009, provisional application No. 61/340,632, filed on Mar. 19, 2010.

(51) Int. Cl.
*B25B 11/00* (2006.01)
(52) U.S. Cl.
USPC .............................. 269/266; 269/21; 269/303
(58) Field of Classification Search
USPC .................... 248/127, 188.2, 188.4; 269/309, 269/313, 314, 900, 21, 265, 266, 289 R, 32, 269/37, 71, 903; 74/25, 52, 89.2, 89.33
See application file for complete search history.

(56) References Cited

U.S. PATENT DOCUMENTS

| | | | | |
|---|---|---|---|---|
| 4,088,032 A * | 5/1978 | O'Connor | ......................... | 74/25 |
| 4,088,312 A * | 5/1978 | Frosch et al. | .................... | 269/21 |
| 4,169,338 A * | 10/1979 | Eik | ................................. | 52/118 |
| 4,200,272 A * | 4/1980 | Godding | ........................ | 269/26 |
| 4,366,758 A * | 1/1983 | Brecher | .......................... | 108/64 |
| 4,527,783 A * | 7/1985 | Collora et al. | ................... | 269/21 |
| 4,684,113 A * | 8/1987 | Douglas et al. | .................. | 269/21 |
| 5,026,033 A * | 6/1991 | Roxy | ............................... | 269/45 |
| 5,457,868 A * | 10/1995 | Blaimschein | .................... | 29/559 |
| 5,623,176 A * | 4/1997 | Brandt, Jr. | ....................... | 310/80 |
| 5,846,464 A * | 12/1998 | Hoffman | ........................ | 264/219 |
| 6,032,348 A * | 3/2000 | Haas et al. | ....................... | 29/434 |
| 6,158,727 A * | 12/2000 | Fox | .................................. | 269/20 |
| 6,453,544 B2 * | 9/2002 | Cioletti et al. | ................... | 29/721 |
| 6,476,525 B2 * | 11/2002 | Sato et al. | ........................ | 310/20 |
| 6,702,272 B2 * | 3/2004 | Monvavage | .................... | 269/266 |

(Continued)

*Primary Examiner* — Lee D Wilson
*Assistant Examiner* — Tyrone V Hall, Jr.
(74) *Attorney, Agent, or Firm* — Olympic Patent Works PLLC

(57) ABSTRACT

Embodiments of the present invention include various different types and sizes of automated, computer-controlled, adjustable machine-tool work-piece mounting systems used to support and constrain movement of work pieces during manufacture, repair, and maintenance. The automated, computer-controlled, adjustable machine-tool work-piece mounting systems that represent embodiments of the present invention are implemented from one or more adjustable machine-tool work-piece mounting-system modules. Each adjustable machine-tool work-piece mounting-system module comprises an array of extendable supports with non-circular and non-elliptical cross sections. In certain embodiments of the present invention, the extendable supports are extended and retracted along a direction approximately normal to a substrate or surface of the automated, computer-controlled, adjustable machine-tool work-piece mounting-system module by linear actuators and are maintained at desired positions by compressed-air brakes. Electrical power and control signals are delivered together through a common cable or cables to the linear actuators, with delivered electrical energy stored within capacitors of the linear actuators and used to drive support-extension components and switches within the linear actuators.

15 Claims, 20 Drawing Sheets

U.S. PATENT DOCUMENTS

| | | | | |
|---|---|---|---|---|
| 6,775,904 | B1* | 8/2004 | Duebel | 29/760 |
| 7,364,147 | B2* | 4/2008 | Shinozaki | 269/266 |
| 7,416,176 | B2* | 8/2008 | Hamann | 269/266 |
| 8,057,206 | B1* | 11/2011 | McKnight | 425/89 |
| 8,141,828 | B2* | 3/2012 | Clark | 248/188.4 |
| 2002/0037054 | A1* | 3/2002 | Schurig | 375/257 |
| 2003/0042858 | A1* | 3/2003 | Weinbrenner | 318/139 |
| 2004/0145105 | A1* | 7/2004 | Halford | 269/266 |
| 2006/0151930 | A1* | 7/2006 | Moncavage | 269/266 |
| 2006/0261533 | A1* | 11/2006 | Freeland | 269/266 |
| 2006/0267262 | A1* | 11/2006 | Schiavi et al. | 269/21 |
| 2007/0295125 | A1* | 12/2007 | Marthaler et al. | 74/89.29 |
| 2008/0048514 | A1* | 2/2008 | Hoffmann et al. | 310/78 |
| 2008/0056809 | A1* | 3/2008 | Kielczewski et al. | 403/118 |
| 2009/0057971 | A1* | 3/2009 | Bumgarner et al. | 269/21 |
| 2009/0230338 | A1* | 9/2009 | Sanders et al. | 251/129.01 |

* cited by examiner

AUTOMATED, ADJUSTABLE, MACHINE-TOOL WORK-PIECE-MOUNTING APPARATUS

CROSS-REFERENCE TO RELATED APPLICATIONS

This application claims the benefit of Provisional Application No. 61/271,132, filed Jul. 17, 2009 and Provisional Application No. 61/340,632, filed Mar. 19, 2010.

TECHNICAL FIELD

The present invention is related to machine tools, automated and semi-automated manufacturing, and, in particular, to an automated, adjustable, machine-tool work-piece mounting apparatus that is computationally controlled to conform to the surface of a work piece in order to provide a stable platform for the work piece in a wide variety of different machine-tool processes.

BACKGROUND

While drilling, milling, shaping, cutting, burnishing, smoothing, or carrying out other such processes on parts and components of machines, devices, and other manufactured objects, it is generally desirable, regardless of the shape of the part or component undergoing the process, to firmly support and constrain motion of the part or component. For example, machinists employ a wide variety of work-piece holders that feature adjustable surfaces and clamping components in order to rigidly mount work pieces during drilling, shaping, and milling operations. As another example, various machine tools, including lathes, feature chambers and clamping components to constrain motions of a work piece that is precisely rotated about a horizontal axis and/or translated along the horizontal axis during a lathe operation. Similarly, even very large parts and components, such as aircraft wings, aircraft fuselages, wind-turbine blades, and many other large manufactured items need to be supported and held in place while undergoing various different manufacturing operations.

In order to support parts, components, and other objects during manufacturing and repair operations, it was common, in the past, for manufacturers to design and produce a variety of different, component-specific large-scale jigs, or work-piece holders, on which large-scale parts and components could be supported and immobilized during manufacture. However, the cost of producing, employing, maintaining, and storing such large-scale work-piece holders can be prohibitive, particularly when the volume of production of the large-scale manufactured parts is modest. More recently, complex, very large-scale machine tools have been developed to serve as adjustable mounting systems, or jigs, for very large work pieces. These adjustable mounting systems are generally computer controlled and feature large numbers of complex, hydraulically controlled support members that can be positioned according to computationally encoded work-piece surfaces. While cost effective in comparison to designing, implementing, maintaining, and storing special-purpose mounts and jigs, these large-scale adjustable machine-tool mounting systems are nonetheless expensive, include many failure-prone components, use significant amounts of energy to maintain the positions of the support members with respect to the surfaces of the work pieces, are difficult to relocate, once constructed, and may be susceptible to damage from the manufacturing processes undertaken on work pieces supported by the adjustable machine-tool mounting systems.

Designers, manufacturers, and users of adjustable machine-tool mounting systems continue to seek improvements in the adjustable machine-tool mounting systems to facilitate manufacturing processes and expand the applicability of automated, adjustable machine-tool mounting systems within industry.

SUMMARY

Embodiments of the present invention include various different types and sizes of automated, computer-controlled, adjustable machine-tool work-piece mounting systems used to support and constrain movement of work pieces during manufacture, repair, and maintenance. The automated, computer-controlled, adjustable machine-tool work-piece mounting systems that represent embodiments of the present invention are implemented from one or more adjustable machine-tool work-piece mounting-system modules. Each adjustable machine-tool work-piece mounting-system module comprises an array of extendable supports with non-circular and non-elliptical cross sections. In certain embodiments of the present invention, the extendable supports are extended and retracted along a direction approximately normal to a substrate or surface of the automated, computer-controlled, adjustable machine-tool work-piece mounting-system module by linear actuators and are maintained at desired positions by compressed-air brakes. Electrical power and control signals are delivered together through a common cable or cables to the linear actuators, with delivered electrical energy stored within capacitors of the linear actuators and used to drive support-extension components and switches within the linear actuators.

DETAILED DESCRIPTION

Embodiments of the present invention are directed to computer-controlled, automated, adjustable machine-tool work-piece mounting systems. In the following discussion, these will be referred to as "WM systems." As discussed below, the WM systems that represent embodiments of the present invention are constructed from one or more computer-controlled, automated, adjustable machine-tool work-piece-mount modules, referred to in the following discussion as "WMS modules." The WM systems that represent embodiments of the present invention are characterized by ease of deployment, economy of manufacture, low energy consumption, high reliability, ease of maintenance, scalability, and flexibility. The WM systems that represent embodiments of the present invention include a large number of innovations and improvements with respect to existing machine-tool systems.

Figure 1:
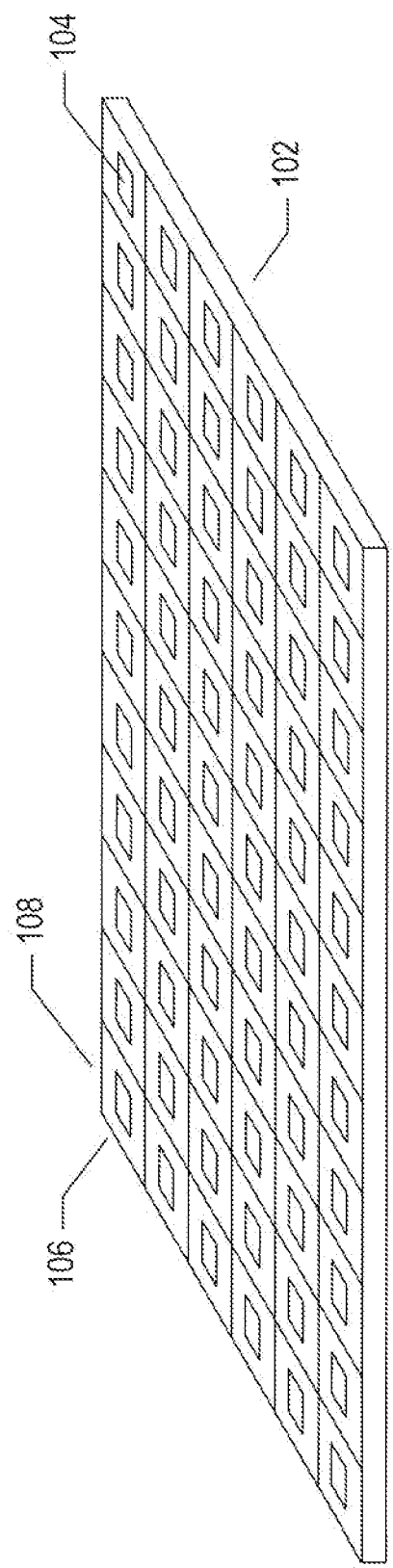
FIGS. 1-2 illustrate the basic concept of a computer-controlled, automated, adjustable machine-tool work-piece mounting systems ("WM system") that represents one embodiment of the present invention.
Figure 2:
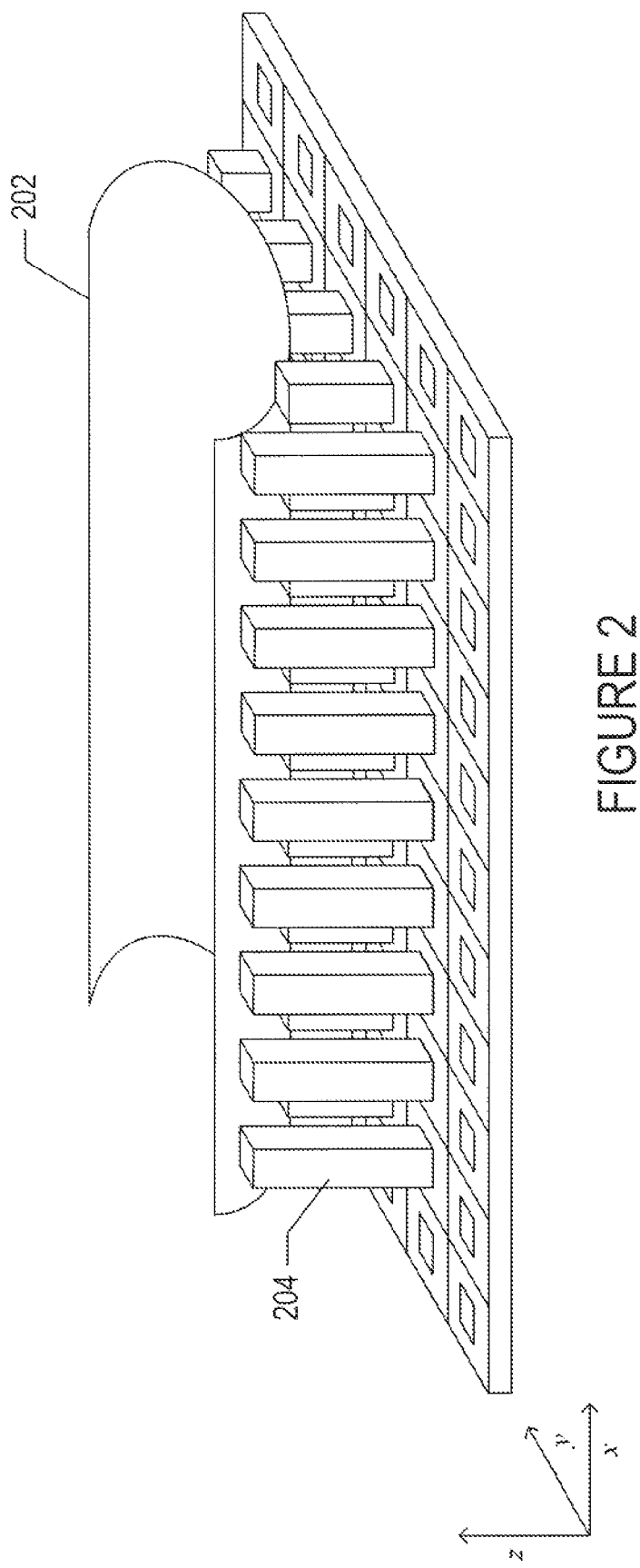

FIGS. 1-2 illustrate the basic concept of a WM system that represents one embodiment of the present invention. The WM system, as shown in FIG. 1, essentially consists of an array 102 of extendable supports. In FIG. 1, the extendable supports are retracted, with their ends flush to the surface of the WM system. Thus, only the square ends of the extendable supports, such as square end 104, are visible. The WM system shown in FIG. 1 is an array of dimension 6×11. Or, in other words, the WM system shown in FIG. 1 comprises six rows of extendable supports, such as row 106, each containing 11 columns of extendable supports, such as the first column in each row, column 108, for a total of 66 extendable supports. As shown in FIG. 2, all or a subset of the extendable supports can be extended, under computer control, and held in extended positions indefinitely in order to support a work piece. In FIG. 2, the work piece 202 is a long structure with a curved cross section supported by a subset of the extendable supports, including extended support 204. The extendable supports can be extended and fixed, at a desired position, with extremely high accuracy. In certain embodiments of the WM system that represent embodiments of the present invention, the end of an extendable support can be positioned and held in a position with sub millimeter accuracy in all three Cartesian coordinate axes. In other embodiments of the WM system that represent embodiments of the present invention, the end of an extendable support can be positioned and held in a position with micrometer accuracy in all three Cartesian coordinate axes. This accuracy is a product of accurate configuration, single-dimensional z-axis translation of the extendable supports, digital-linear-encoding of z-axis position, and precise brakes that do not interfere with prior positioning of the extendable supports. Extension of the extendable supports is carried out using electrical energy stored in capacitors within linear actuators that extend the supports, and the extendable supports are held in position, indefinitely, by precision compressed-air brakes that operate on pressurized air, or "shop air." WM systems that represent embodiments of the present invention control the positioning of the extendable supports by a computer system. The computer system can position the extendable supports according to a computationally encoded description of the surface of a work piece to sub millimeter accuracy, even within WM systems with surfaces or substrates that cover hundreds of square meters.

Figure 3:
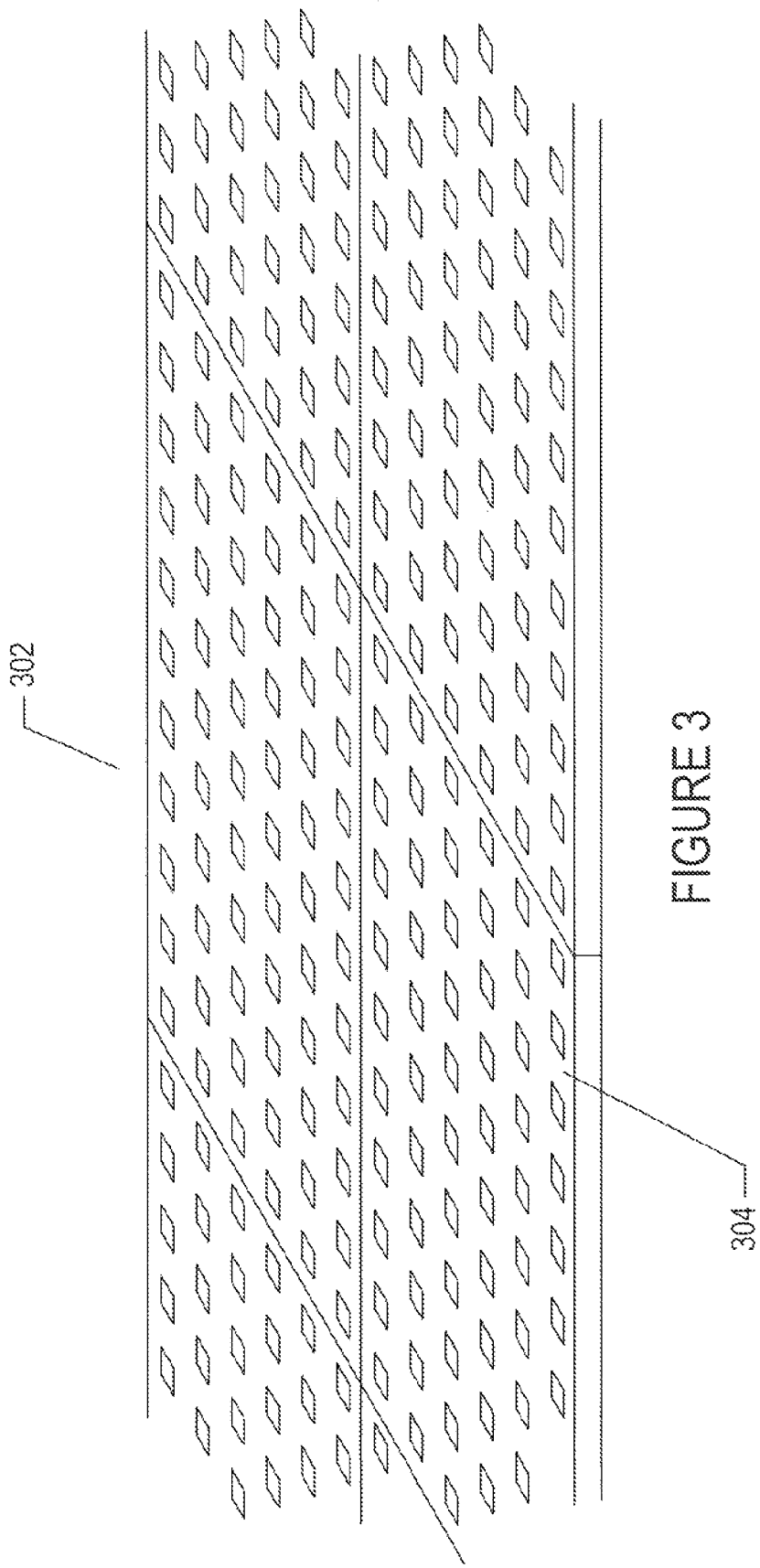
FIG. 3 illustrates one feature of the WM systems that represent embodiments of the present invention.

FIG. 3 illustrates one feature of the WM systems that represent embodiments of the present invention. As shown in FIG. 3, a large array of extendable supports 302 can be implemented by combining two or more WMS modules, each WMS module, shown in FIG. 3, a 6×11 array of extendable supports, such as WMS module 304, such as the array shown in FIG. 1. A WMS module may contain an essentially arbitrary number of rows and columns of linear-actuator-controlled extendable supports, limited primarily by the mechanical stability of the surface member, such as a flat platen, to which the linear actuators are affixed. While, in the current discussion, the WMS modules and WM systems are shown as flat, level arrays, in alternative embodiments of the present invention, the WMS modules and WM systems may comprise regular arrangements of extendable supports across various types of curved surfaces, including cylindrical and spherical sections. In many WM-system embodiments of the present invention, the surface of the WM system is rigid, mechanically stable, and designed to be unaffected by manufacturing processes carried out on work pieces supported by the WM systems. For example, the surface of the WM system may be a thick plate of steel or other robust material and the extendable supports may extend through gaskets and seals flush with the surface of the WM system so that water and other fluids as well as dust and shavings cannot penetrate the surface and foul or corrode the linear actuators and other WM-system components below the surface.

Figure 4:
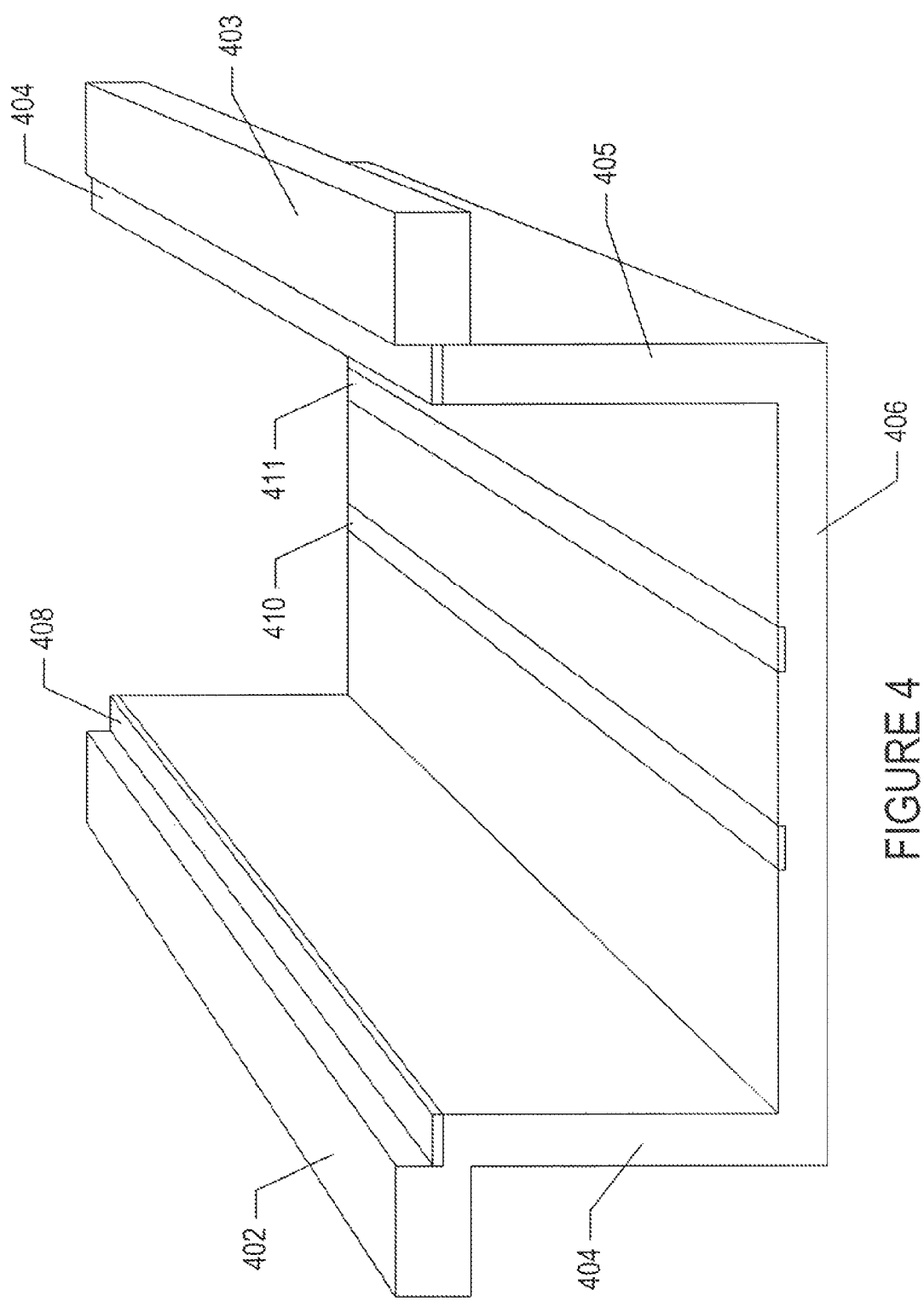
FIG. 4 illustrates one approach to implementation of a WM system according to an embodiment of the present invention.
Figure 5:
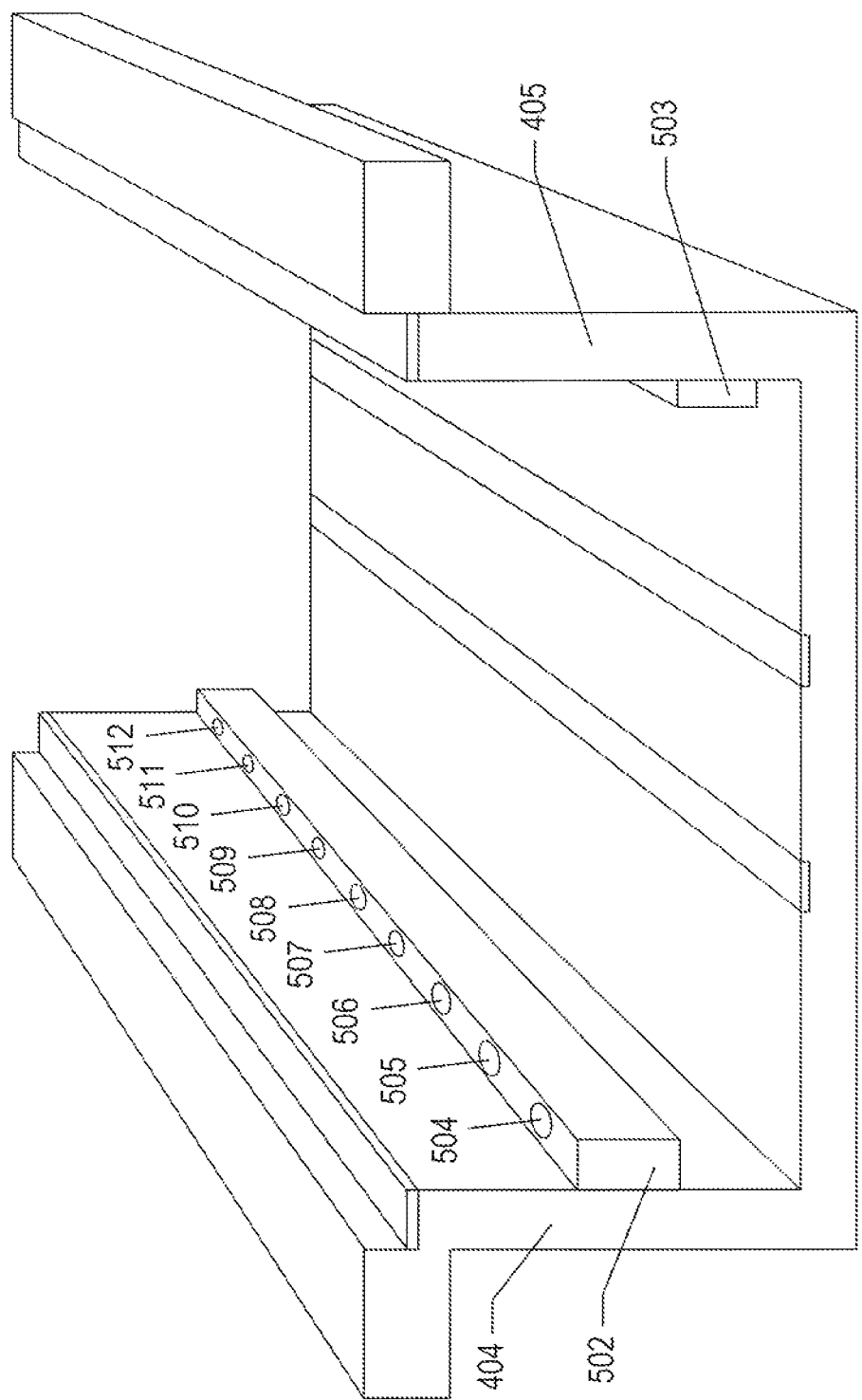
FIG. 5 illustrates services distribution to WM system modules ("WMS modules") provided by the rectangular chamber shown in FIG. 4 according to one embodiment of the present invention.
Figure 6:
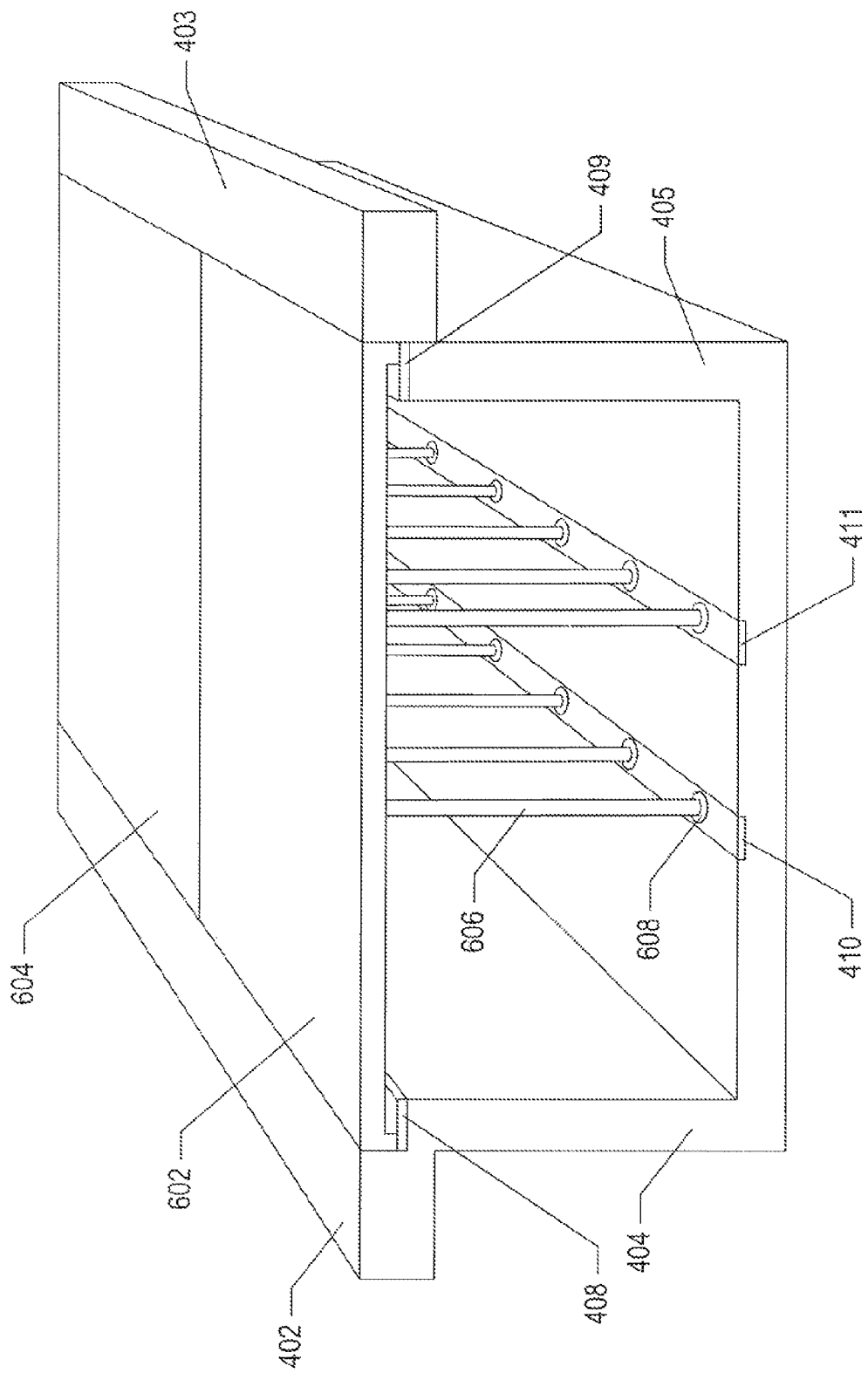
FIG. 6 illustrates mounting of two WMS modules within the rectangular chamber shown in FIG. 4, according to one embodiment of the present invention.

FIGS. 4-6 illustrate one approach to implementation of a WM system according to one embodiment of the present invention. FIG. 4 shows a rectangular chamber within which WMS modules can be mounted in order to construct a WM system. The rectangular chamber comprises concrete rails 402-403, vertical walls 404-405, and a floor 406 lining an excavated rectangular volume. Steel plates, or runners, are embedded in the top surfaces of the vertical walls 408-409 and in the floor 410-411. These steel runners provide solid, rigid, durable surfaces to which WM-system components are mated.

FIG. 5 illustrates services distribution to WMS modules provided by the rectangular chamber shown in FIG. 4 according to one embodiment of the present invention. A first distribution line 502 is shown, in FIG. 5, affixed to, and running the length of, the interior side of a first vertical concrete wall 404. This distribution line distributes compressed air and vacuum, via compressed-air and vacuum manifolds, to linear-actuator-controlled extendable supports within WMS modules. The distribution line 502 includes ports 504-512 to which compressed-air and vacuum conduit or hosing can be attached to distribute compressed air and vacuum to rows of linear-actuator-controlled extendable supports within WMS modules. In similar fashion, electronic communications and electrical power is distributed by a linear distribution line 503 affixed to, and running the length of the second vertical wall 405.

FIG. 6 illustrates mounting of two WMS modules within the rectangular chamber shown in FIG. 4, according to one embodiment of the present invention. As shown in FIG. 6, a first WMS module 602 is mounted adjacent to a second WMS module 604 so that the substrates of the two WMS modules are flush with, and form a continuous surface with, the first and second concrete rails 402 and 403. The WMS modules are supported by vertical support members, such as vertical support member 606, with mounting adapters, such as mounting adapter 608, aligned with the embedded steel runners 410 and 411. The support members are mated to the lower surface, not shown in FIG. 6, of the WMS-module substrates or to structural members beneath the WMS-module substrates. In addition, the WMS modules are mated to, and lie along, the two embedded steel runners 408 and 409 along the tops of the vertical concrete walls 404 and 405.

It should be emphasized that the rectangular chamber and associated mounting surfaces shown in FIGS. 4-6 represent only one of many possible embodiments of support systems onto which WM-system embodiments of the present invention may be mounted. In general, the support systems feature simple structures with embedded surfaces for mounting WMS modules as well as distribution lines for compressed air, vacuum, and communications/power to the linear actuators within the WMS modules.

Figure 7A:
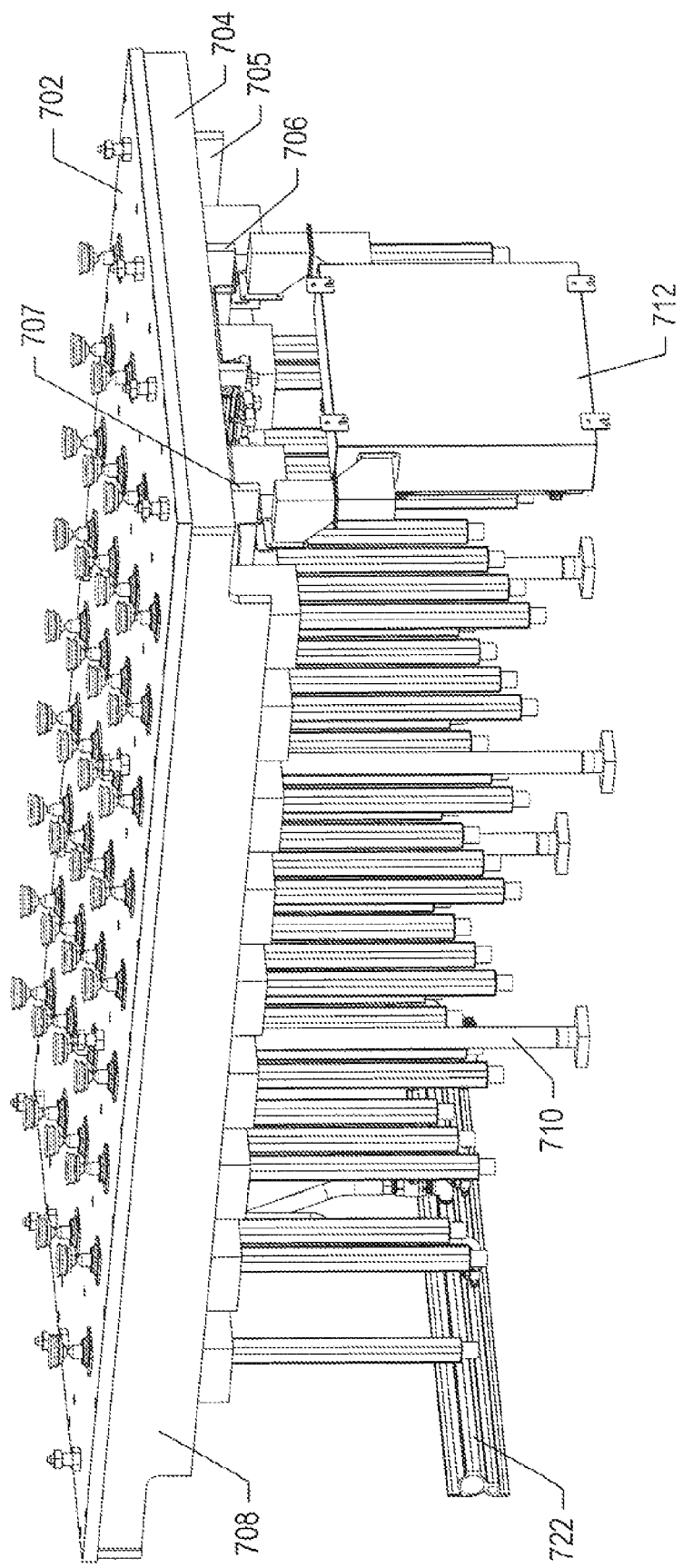
FIGS. 7A-B illustrate a WMS module that represents one embodiment of the present invention.
Figure 7B:
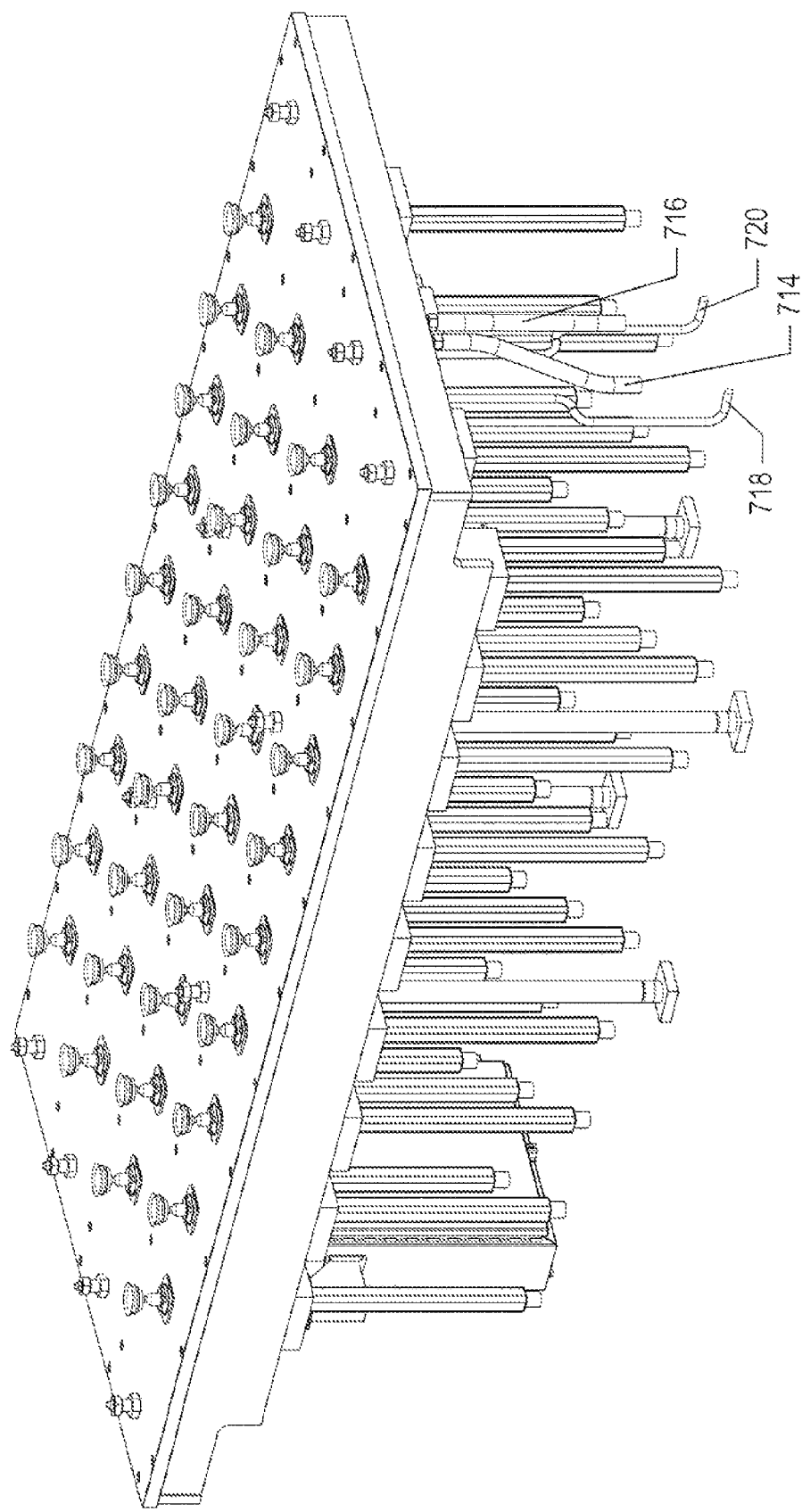

FIGS. 7A-B illustrate a WMS module that represents one embodiment of the present invention. The module includes a platen, or flat WMS-module substrate 702, to which an array of linear-actuator-controlled extendable supports is attached from below (only the ends of the extendable supports are visible in FIG. 7). In alternative embodiments, the linear-actuator-controlled extendable supports may be affixed to the upper surface of the WMS-module substrate. The substrate is supported by various frame-like support members 704-708. Vertical support members, such as vertical support member 710, additionally support the substrate of the WMS module from below. A sealed, metal component box 712 at one end of the WMS module contains communications and electrical-power-delivery components which are interconnected with the communications and electrical power distribution line (503 in FIG. 5). At the far end of the WMS module, vacuum 714 and 716 and compressed-air 718 and 720 hoses or conduits deliver compressed air and vacuum to the WMS module from the vacuum and compressed-air distribution line 722 (502 in FIG. 5).

Figure 8:
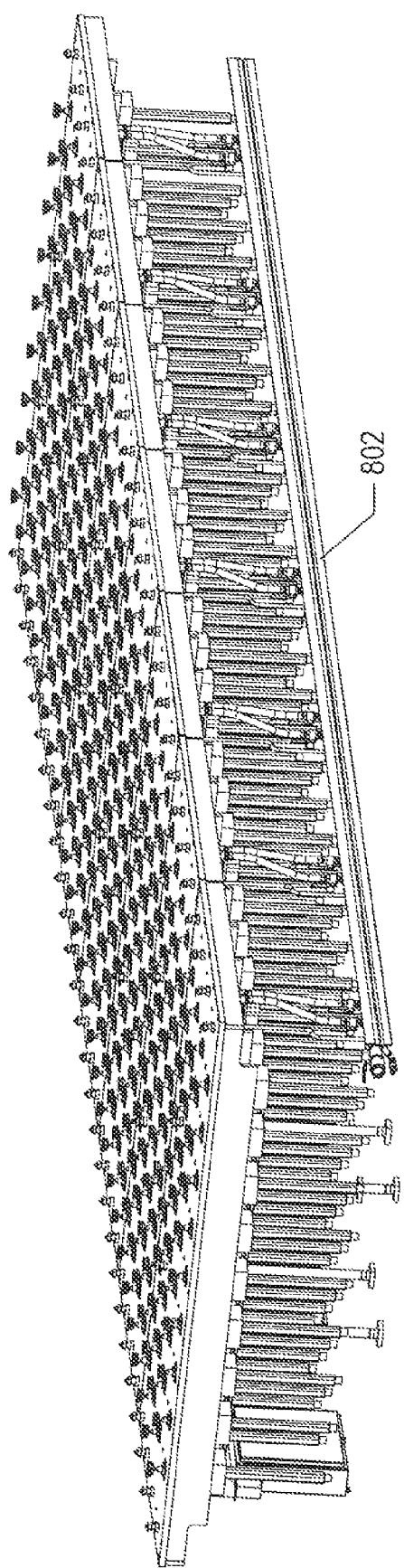
FIG. 8 illustrates a large number of WMS modules, such as the WMS module shown in FIG. 7, mounted together within a WM-system chamber, discussed above with reference to FIGS. 4-6, to form a large WM system according to one embodiment of the present invention.

FIG. 8 illustrates a large number of WMS modules, such as the WMS module shown in FIG. 7, mounted together within a WM-system chamber, discussed above with reference to FIGS. 4-6, to form a large WM system according to one embodiment of the present invention. In FIG. 8, the compressed-air and vacuum distribution line 802 is seen to provide local vacuum and compressed-air distribution hoses or conduits to the multiple WMS modules.

Figure 9:
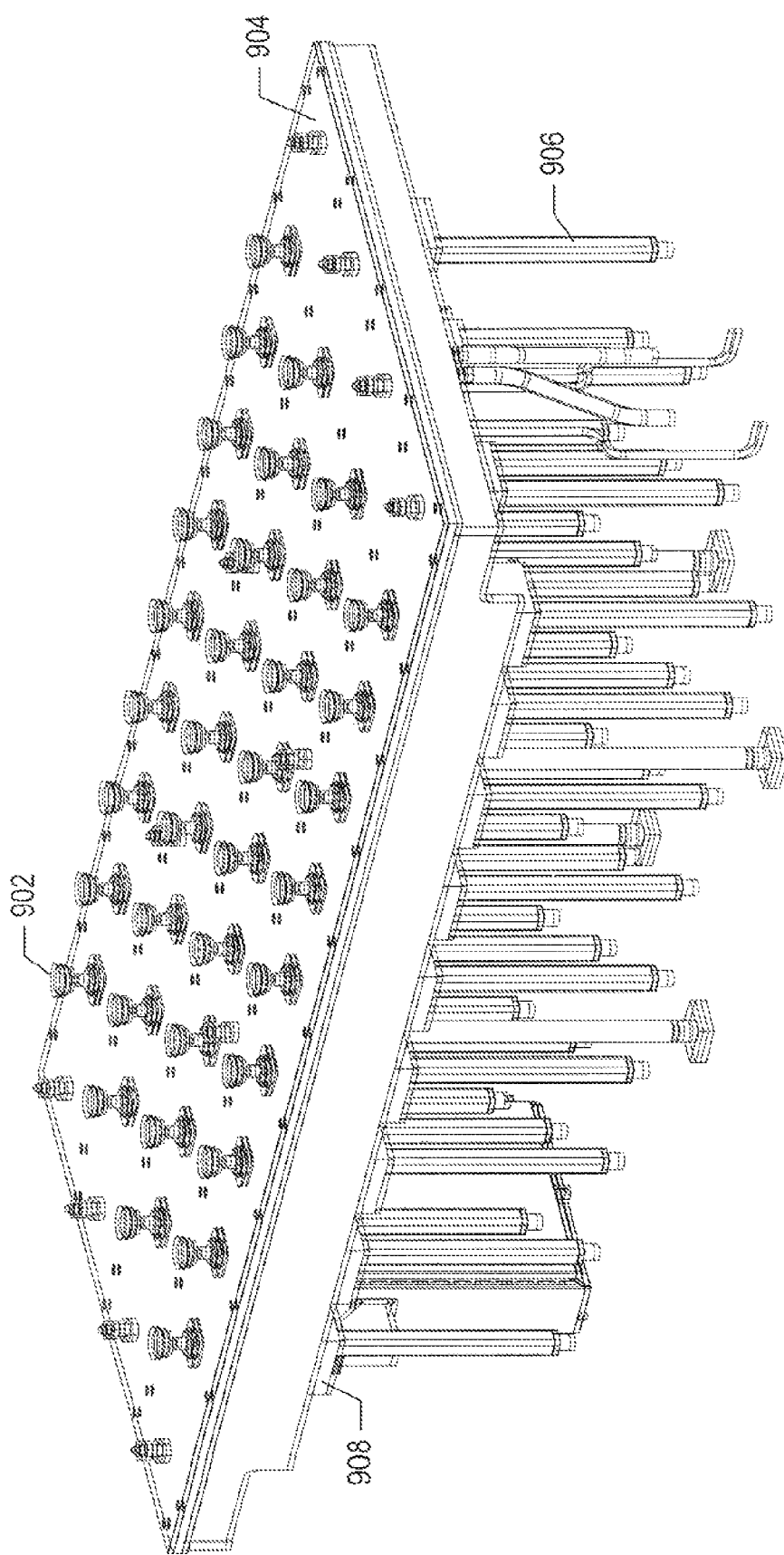
FIG. 9 illustrates linear-actuator-controlled extendable supports mounted to the substrate of a WMS module according to one embodiment of the present invention.

FIG. 9 illustrates linear-actuator-controlled extendable supports mounted to the substrate of a WMS module according to one embodiment of the present invention. In FIG. 9, vacuum-activated suction cups, such as vacuum-activated suction cup 902, are affixed to the ends of the extendable supports, forming an array of vacuum cups above the substrate, or platen 904, of the WMS module. Extendable supports, such as extendable support 906, are fully retracted below the substrate of the WMS module. The extendable supports pass through linear actuators, such as linear actuator 908, which are affixed to the substrate of the WMS module from below.

Figure 10:
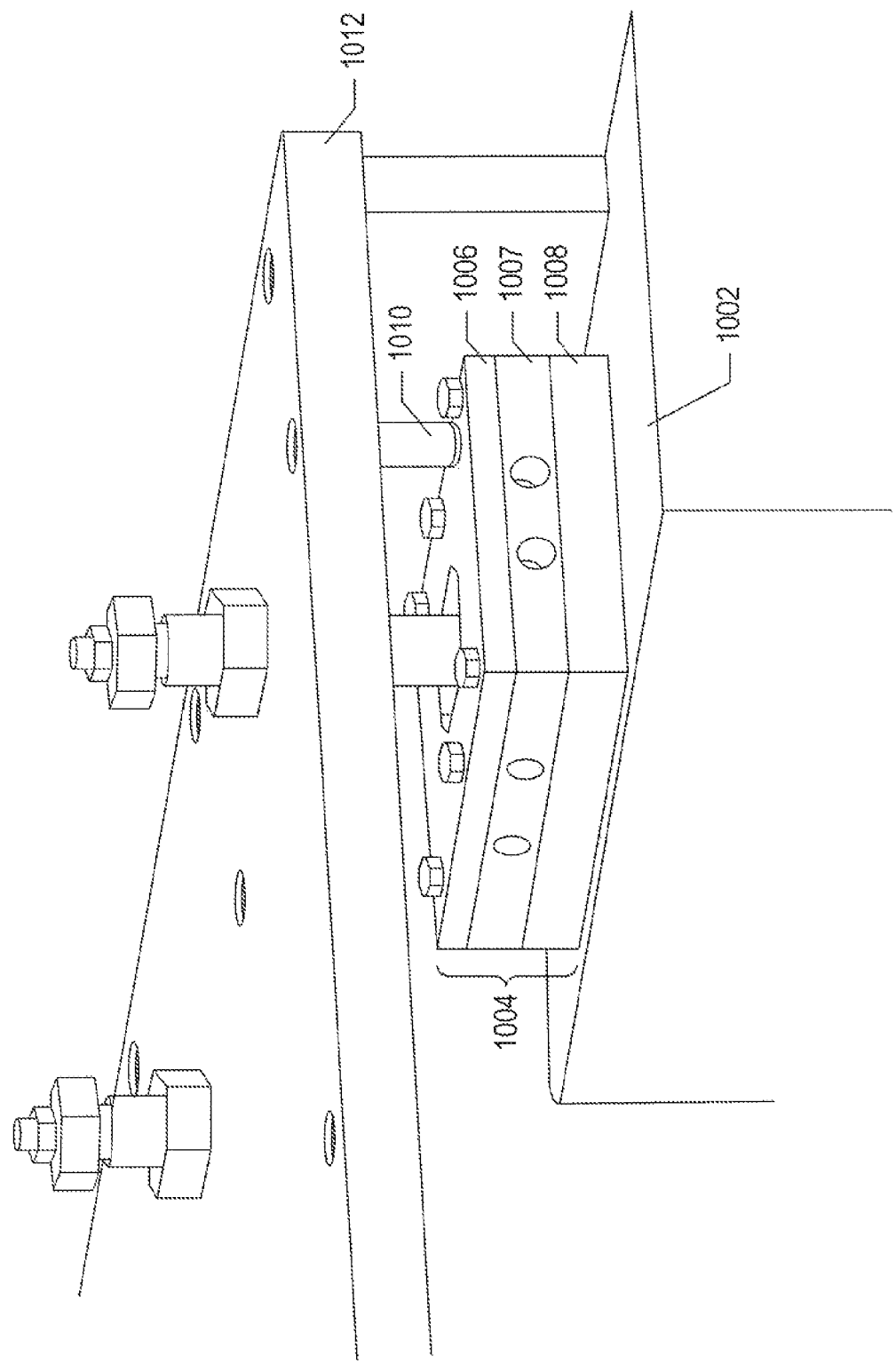
FIG. 10 illustrates a mounting device used to adjustably mount the substrate of a WMS module to a steel runner at the top of a vertical wall of a rectangular chamber for a WMS system according to one embodiment of the present invention.

FIG. 10 illustrates a mounting device used to adjustably mount the substrate of a WMS module to a steel runner at the top of a vertical wall of a rectangular chamber within which a WMS system is mounted, according to one embodiment of the present invention. Because the rectangular receiving chamber for the WMS system may not be completely true in every dimension, the WMS modules must be adjustably mounted to the steel runners of the rectangular chamber so that the substrate of the WMS modules can be precisely leveled and precisely positioned. Considering the z axis of a three-dimensional Cartesian coordinate system to be the vertical direction and the x and y axes to lie horizontally in the plane of the WMS-module substrate, the adjustable mounting device 1002 provides for adjusting a portion of the WMS module, proximal to the adjustable mounting device, in the x, y, and z directions.

A rectangular block 1004 of the adjustable mounting system includes three layers 1006-1008. The lowest layer 1008 is a solid plate. The middle layer 1007 is a solid plate with a large central aperture. The large central aperture is larger, in dimension, than the mounting adapter, or foot, of a vertical member 1010 that is bolted from above and below to the substrate of the WMS module 1012. Because the aperture of the central layer 1007 is larger than the foot of the support member 1010, the support member 1010 can be moved in the x/y directions relative to the bottom slab 1008, which is welded or otherwise fastened to the steel runner, below. The top layer 1006 is also a plate with an aperture larger than the shaft of the vertical support member 1010 but smaller than the foot of the vertical support member, held from above within the larger aperture of the center layer 1007 of the block of layers 1004. When the WMS module is correctly positioned in the x and y directions, bolts passing through the top layer 106 into the middle layer and lower layers 1007 and 1008 are tightened to press the top layer 106 down onto the foot of the vertical support member 1010 in order to hold the vertical support member at the desired x/y position. The z position of the WMS module, proximal to the adjustable mounting device, can be changed by adjusting the positions of the bolts above and below the substrate 1012 of the WMS module.

Figure 11:
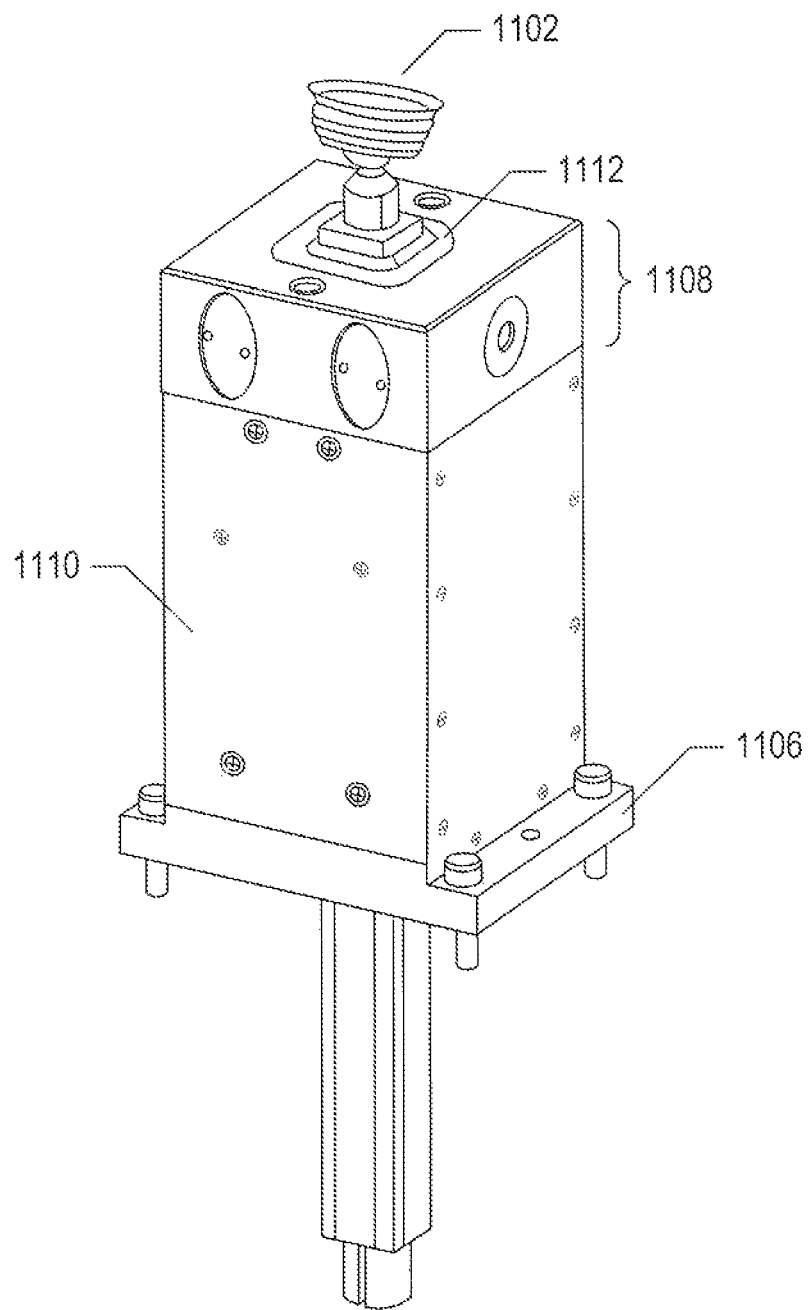
FIG. 11 shows an external view of a linear-actuator-controlled extendable support that represents one embodiment of the present invention.

FIG. 11 shows an external view of a linear-actuator-controlled extendable support that represents one embodiment of the present invention. In FIG. 11, a suction cup 1102 is mounted to the top end of the extendable support, with the lower end of the extendable support 1104 well below the bottom mounting plate 1106 of the linear actuator. A compressed-air brake 1108 is mounted to the top surface of the linear actuator 1110. The compressed-air brake 1108 may be alternatively mounted below the linear actuator, or two compressed-air brakes can be mounted to both ends of the linear actuator. Note that a gasket-like seal 1112 seals the interior of the compressed-air brake so that fluids, dust, shavings, and abrasive material cannot enter the compressed-air brake or linear actuator along the edges of the extendable shaft. The linear actuator shown in FIG. 11 is configured for mounting to the top surface of the WMS-module substrate. The mounting plate 1106 is mounted above the compressed-air brake for embodiments, such as those shown in FIGS. 7-9, in which the linear actuator is mounted below the substrate of the WMS module.

The extendable-support shafts have non-circular and non-elliptical cross sections that inhibit rotation of the extendable-support shafts. In general, the extendable-support shafts feature planar surfaces that extend along the long axis of the extendable-support shafts to provide a braking surface against which compressed-air-operated braking material can be forced to hold the extendable-support shafts in position.

Figure 12:
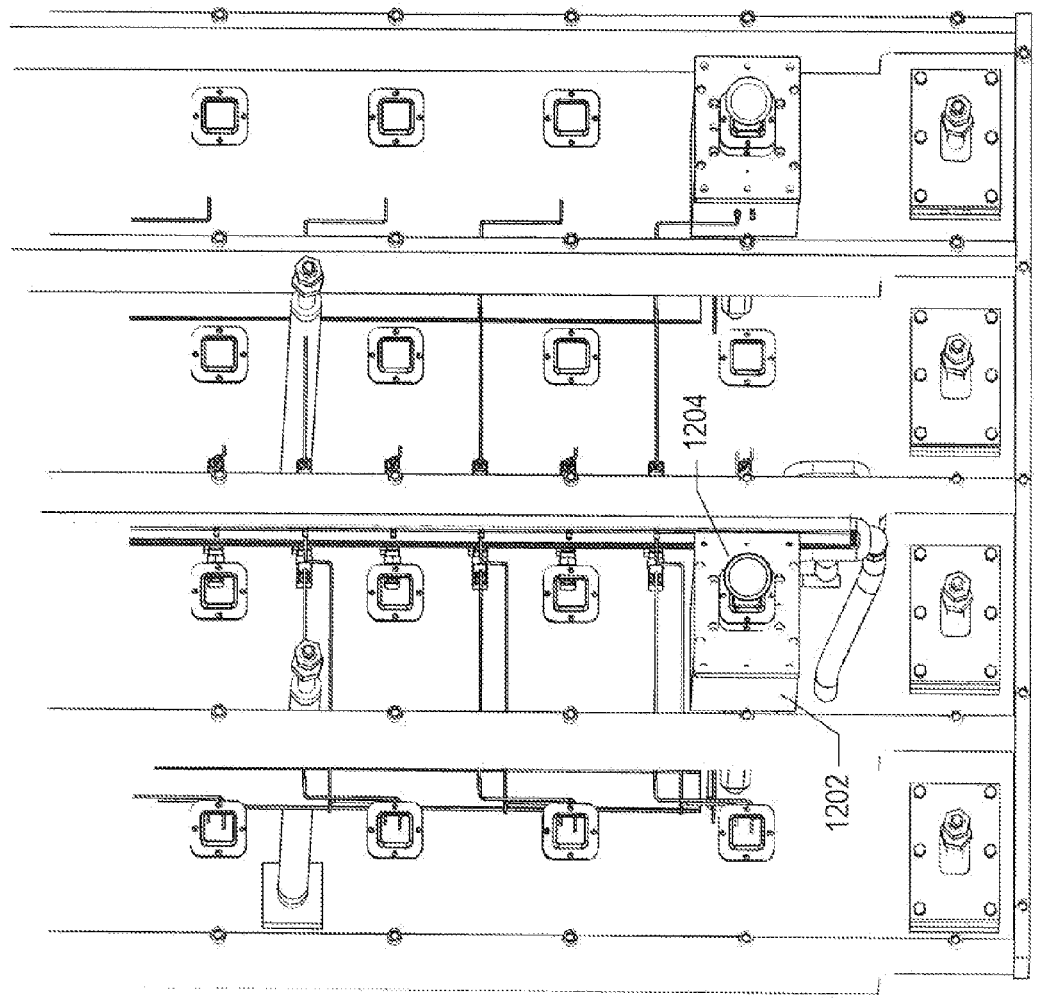
FIG. 12 shows a linear actuator mounted within the support frame below the substrate of a WMS module according to one embodiment of the present invention.

FIG. 12 shows a linear actuator mounted within the support frame below the substrate of a WMS module according to one embodiment of the present invention. In FIG. 12, the substrate of the WMS module is not shown, so that the linear actuator, mounted below the substrate of the WMS module, is visible. In FIG. 12, the linear actuator 1202 can be seen within the frame below the substrate, with the suction cup 1204 affixed to the end of the extendable support pointed upward.

Figure 14:
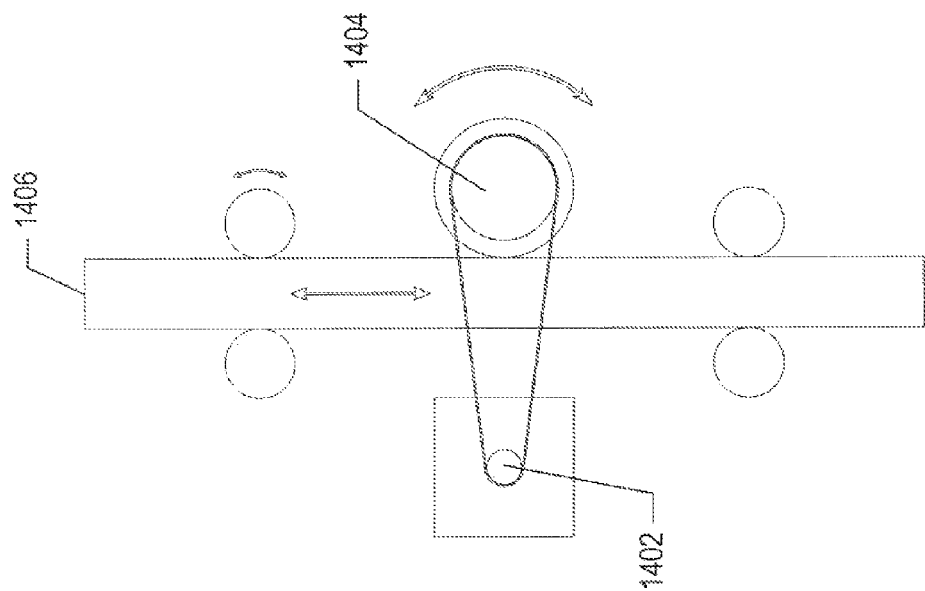
FIGS. 13-14 illustrate the internal components of a linear actuator and compressed-air brake according to one embodiment of the present invention.
Figure 13:
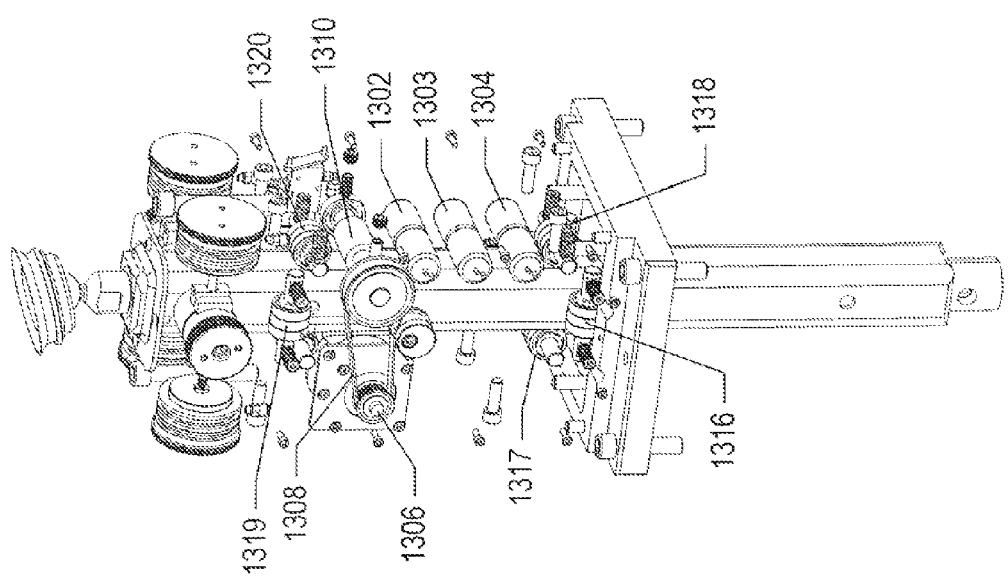
Figure 15:
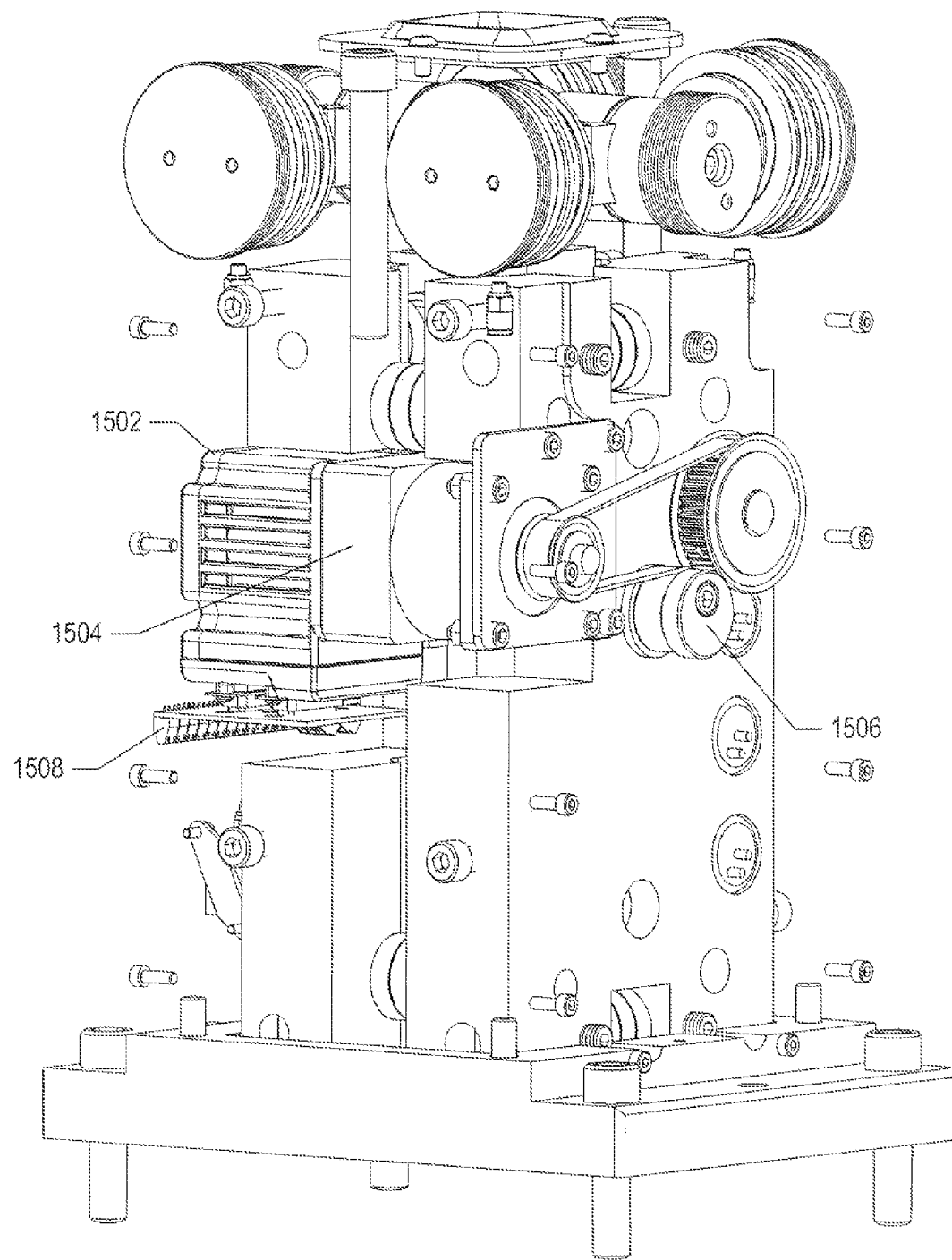
FIG. 15 shows a different view of the internal components of the compressed-air brake and linear actuator that represents one embodiment of the present invention.

FIGS. 13-14 illustrate the internal components of a linear actuator and compressed-air brake according to one embodiment of the present invention. FIG. 13 shows the linear actuator and compressed-air brake without the rectangular housing that encloses the linear actuator and compressed-air brake, revealing internal components of both the compressed-air brake and linear actuator. The linear actuator includes six super capacitors, three of which 1302-1304 are visible in FIG. 13. These super capacitors are charged, by relatively low input voltage from a combined communications/power cable, over time. They provide power to an electric motor, not visible in FIG. 13, interconnected with a planetary gear box that together drive the rotating pulley shaft 1306 that, via belt 1308, drives a rotating shaft on which a urethane roller 1310 is mounted to drive the extendable support upward and downward in the vertical direction under processor control. The extendable shaft is additionally constrained, in the x and y directions, by alignment rollers, five of which 1316-1320 are visible in FIG. 13. FIG. 14 illustrates operation of the linear actuator. The rotation of the drive shaft 1402 by the electrical motor/planetary gear box drives the roller shaft 1404 which rotates the roller (1310 in FIG. 13) against a surface of the extendable shaft 1406 to drive the extendable shaft upward or downward in the vertical, z direction. FIG. 15 shows a different view of the internal components of the compressed-air brake and linear actuator that represents one embodiment of the present invention. In this view, the electrical motor 1502 and planetary gear box 1504 are clearly visible. In addition, a belt-tension-adjusting device 1506 can be seen to control tension on the belt that drives rotation of the roller shaft. A microprocessor-containing printed circuit board ("PCB") 1508 that provides an electronic interface between the linear actuator and a computer is also visible in this view.

Figure 16:
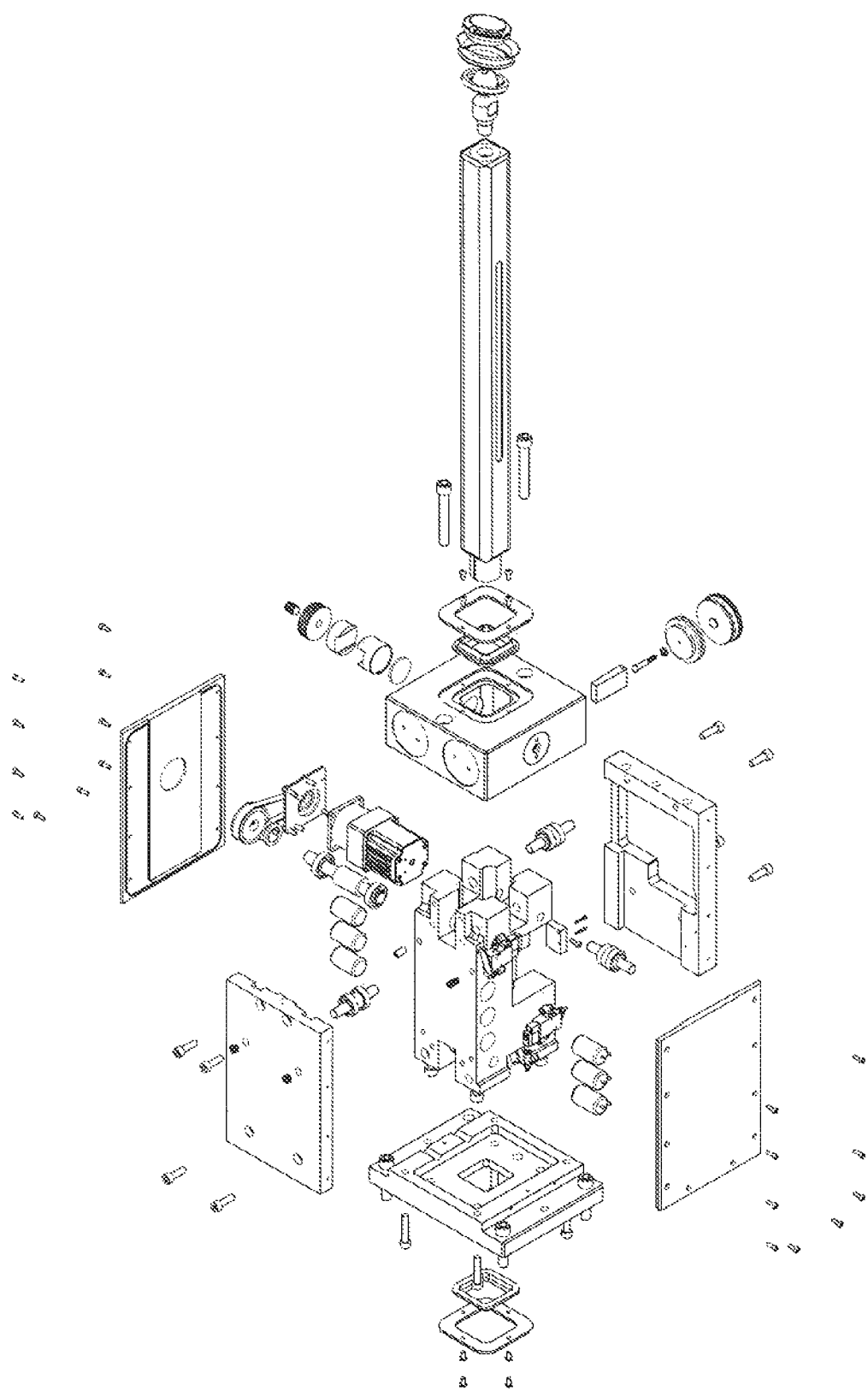
FIG. 16 shows an exploded view of the internal components of the linear actuator and the extendable support that represents one embodiment of the present invention.
Figure 17:
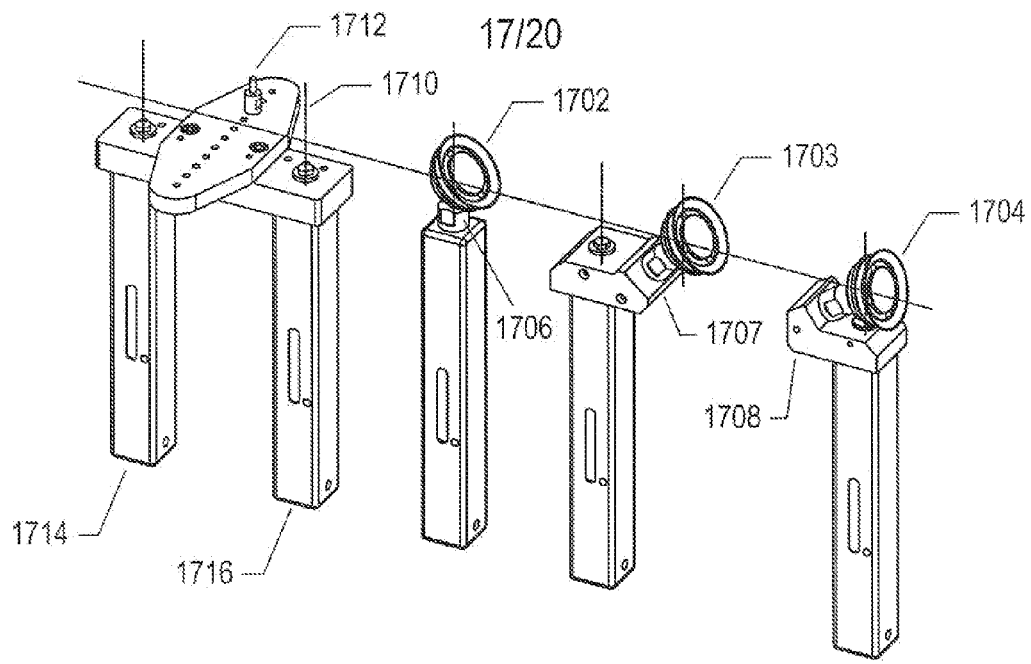
FIG. 17 shows various different types of adapters that can be mounted to the ends of the extendable supports in order to adapt the extendable supports to the surface of a work piece according to one embodiment of the present invention.
Figure 18:
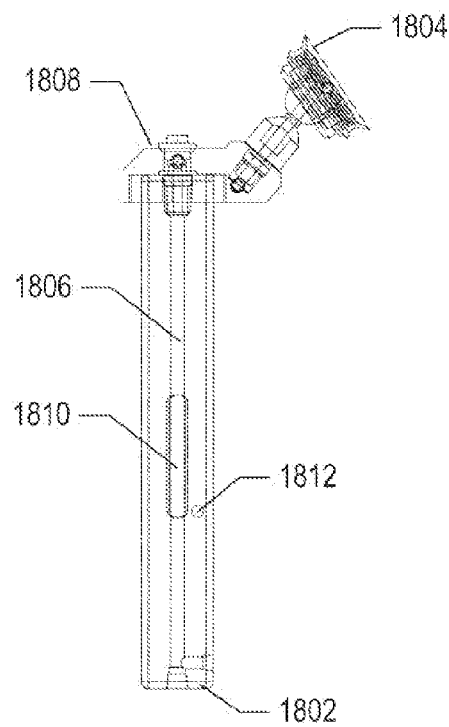
FIG. 18 provides a cross-sectional view of an extendable support and mounted adapter that represents one embodiment of the present invention.

FIG. 16 shows an exploded view of the internal components of the linear actuator and the extendable support that represents one embodiment of the present invention. FIG. 17 shows various different types of adapters that can be mounted to the ends of the extendable supports in order to adapt the extendable supports to the surface of a work piece according to one embodiment of the present invention. Three different vacuum-operated suction-cup adapters 1702-1704 and adapter assemblies 1706-1708 are shown in FIG. 17, along with a plate-like adapter 1710 with features for mounting a tool-like adapter 1712 between two extendable supports 1714 and 1716, are also shown in FIG. 17. FIG. 18 provides a cross-sectional view of an extendable support and adapter that represents one embodiment of the present invention.

Note that vacuum is applied, from a distribution vacuum hose or conduit, to the lower end 1802 of the extended support which is connected to the vacuum-activated vacuum cup 1804 adapter via internal cavities, including vertical cavity 1806, within the extendable support and adapter mounting apparatus 1808. The extendable support includes an encoded magnetic strip 1810 which is read by a digital linear encoder to allow the microprocessor to determine the vertical position of the extendable support and adapter. In addition, two targets sensed by proximity switches, one of which 1812 is shown in FIG. 18, provide for sensing extension of the extendable shaft to either of two extreme extension points and notifying the microprocessor controller to prevent the extendable shaft from being extended above or below the linear actuator.

Figure 19:
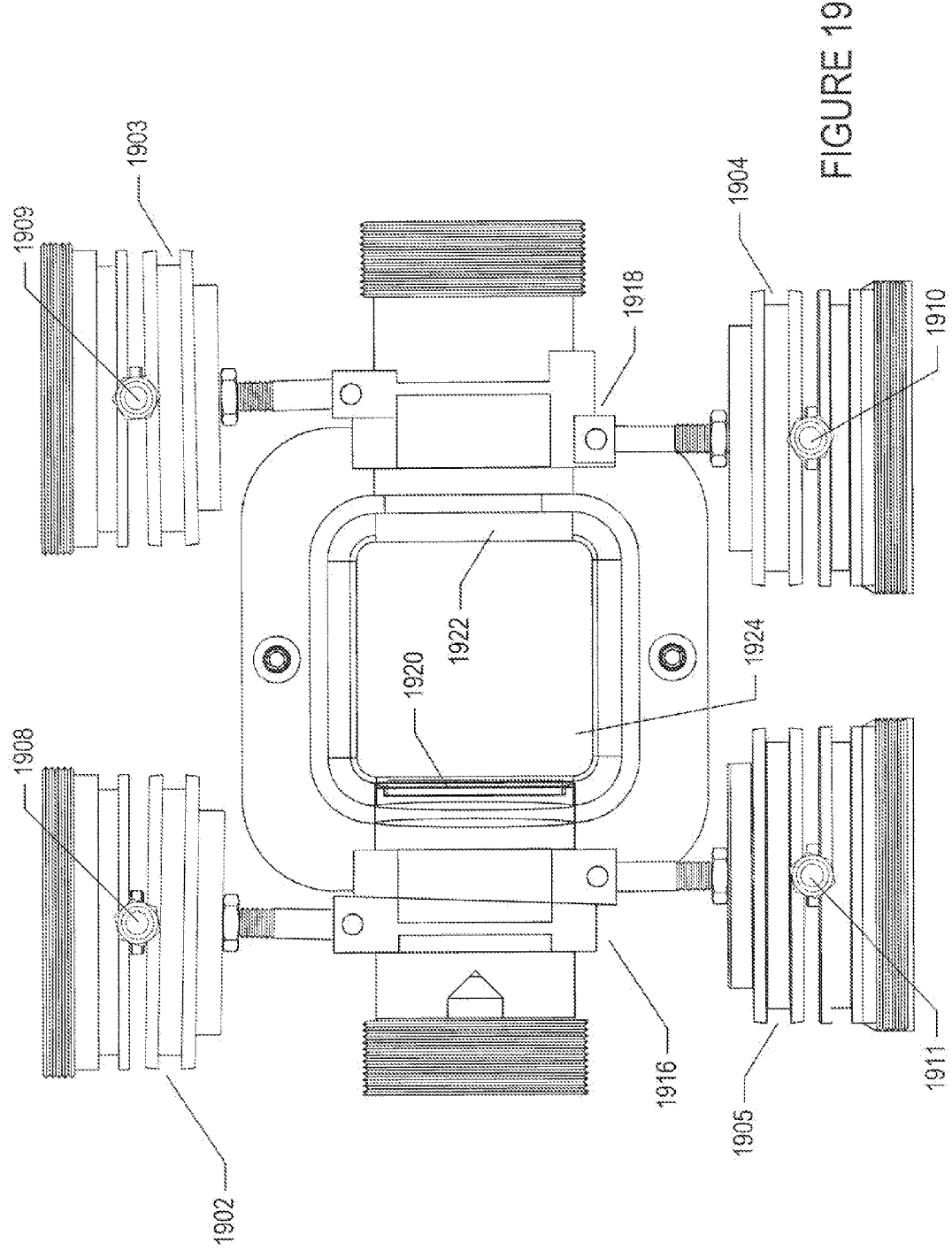
FIG. 19 illustrates, looking top down, the internal components of a compressed-air brake (1108 in FIG. 11) that represents one embodiment of the present invention.

FIG. 19 illustrates, looking top down, the internal components of the compressed-air brake (1108 in FIG. 11) that represents one embodiment of the present invention. The compressed-air brake includes four compressed-air pistons 1902-1905. Compressed air, controlled by an electronic solenoid switch operated by the microprocessor controller, enters four compressed-air ports 1908-1911. When compressed air is input to these ports, the compressed air pistons are forced toward the center of the compressed-air brake, pushing two pairs of wedges 1916 and 1918 together which, in turn, forces braking material 1920 and 1922 inward against opposite surfaces of the extendable shaft of approximately square cross section 1924. The compressed-air brake can exert many thousands of pounds of force against the surfaces of the extendable support when compressed air of even modest compression, less than 100 pounds per square inch, is introduced into the compressed-air ports 1908-1911.

Figure 20:
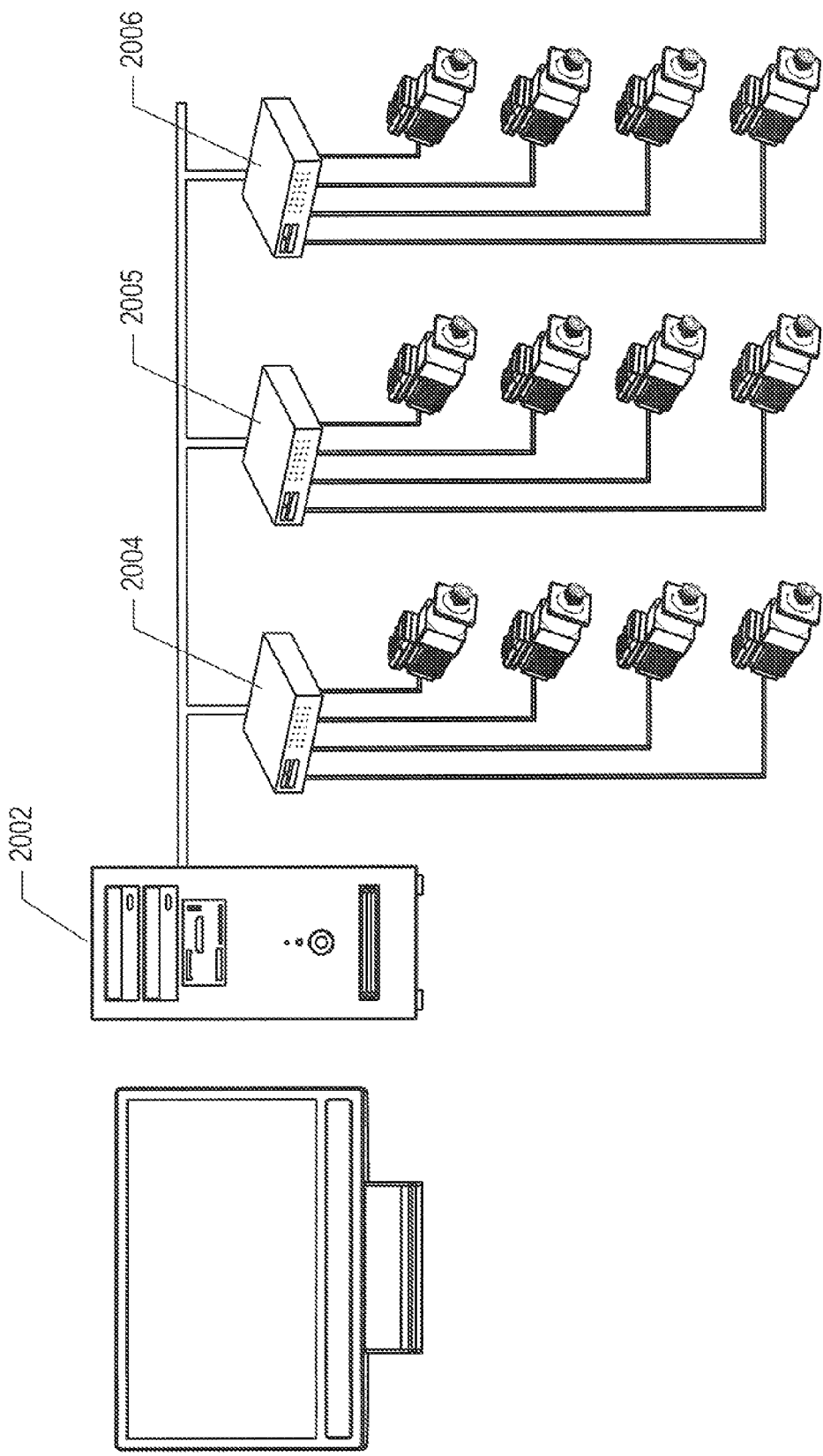
FIG. 20 illustrates the communications and electrical-power distribution architecture of the WM system according to one embodiment of the present invention.

FIG. 20 illustrates the communications and electrical-power distribution architecture of the WM system according to one embodiment of the present invention. The WM system is controlled by an external computer 2002 which, in turn, controls a number of power-over-Ethernet ("POE") hubs 2004-2006. Each POE hub distributes electrical power and Ethernet packets to up to 48 linear actuators through Category 5 ("CAT-5") Ethernet cables.

Figure 21:
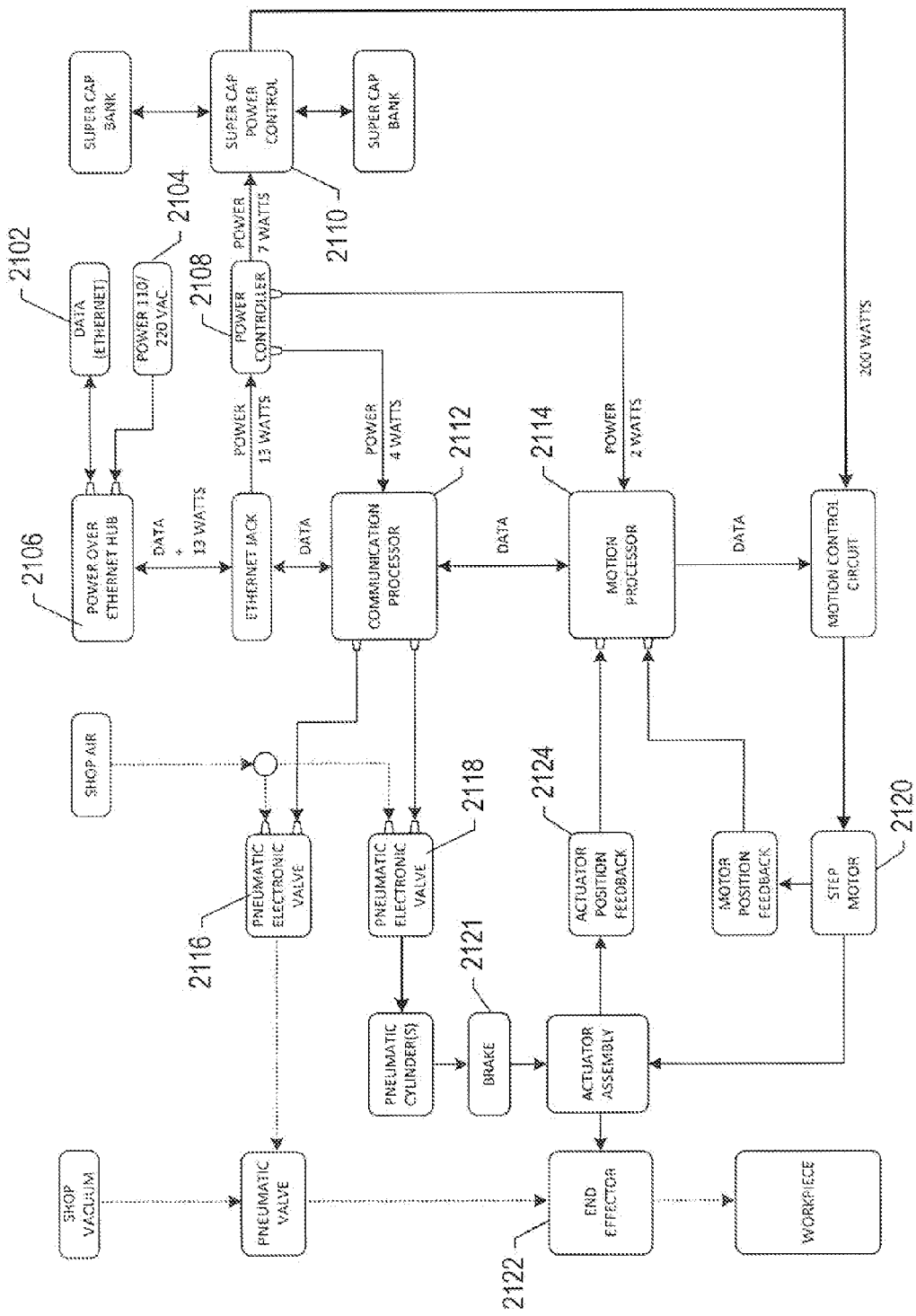
FIG. 21 is a block diagram illustrating control of the WM system according to one embodiment of the present invention.

FIG. 21 is a block diagram illustrating control of the WM system according to one embodiment of the present invention. FIG. 21 shows control within a WM system from the perspective of a single linear actuator. The linear actuator receives Ethernet data 2102 and power 2104 over a CAT-5 Ethernet cable from a POE hub 2106, as discussed above. Within the linear actuator, power from the CAT-5 cable is routed to a power controller 2108 which distributes the power to a bank of super capacitors 2110 and to a communications-processing component 2112 and a motion-processing component 2114, implemented as one or more firmware and/or software-controlled microprocessors. The communications processor essentially implements an electronic interface to the external computer (2002 in FIG. 20) that controls the entire WM system. Upon receiving control commands from the external computer, the communications processor implements the commands by controlling electronic solenoid valves 2116 and 2118 and an electric motor 2120 within the linear actuator to control provision of shop air to the compressed-air brake 2121 and vacuum to the adapter 2122 at the end of the extendable shaft as well as position the extendable support. The digital linear encoder provides position feedback 2124 to the motion processor 2114.

Although the present invention has been described in terms of particular embodiments, it is not intended that the invention be limited to these embodiments. Modifications will be apparent to those skilled in the art. For example, as discussed above, WMS modules may contain an essentially arbitrary number of linear-actuator-controlled extendable shafts in an essentially arbitrary number of rows and columns. As discussed above, the substrate of a WMS module may be flat, as in the embodiments described above, but may also, alternatively, have a curved surface, such as a spherical or cylindrical section. Although the step motor/planetary gear box/rotating-roller mechanism discussed above has proven to be an extremely efficient and precise mechanism for extending and retracting the extendable supports, and the compressed-air brake has proven to be an extremely efficient system for holding extendable shafts in fixed positions, other mechanisms for extending and retracting the extendable shafts and holding the extendable shafts in position are possible. A wide variety of different types of support structures and frameworks for WM systems may also be devised. A wide variety of different user interfaces can be implemented to provide control of extendable-shaft extensions to allow the WM system to provide a conforming support structure for various types of work pieces and work-piece surfaces. The computer controlling program may receive electronically encoded descriptions of the work piece and automatically adjust extendable-shaft positions according to the description in order to provide a conforming support. Alternatively, a finer granularity of extendable-support-positioning control may be provided through any number of different types of interfaces. In addition, the computer system provides configuration modules for configuring and calibrating the array of linear-actuator-controlled extendable supports.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. An automated, adjustable, machine-tool work-piece-mounting system comprising:
    a substrate;
    linear actuators, which control extendable supports having non-circular and non-elliptical cross sections, mounted to the substrate to allow the extendable supports to be extended and retracted in a direction approximately normal to the substrate, the extension and retraction of the extendable supports powered by super capacitors within the linear actuators;
    compressed-air brakes mounted above and/or below the linear actuators to hold the extendable supports in a determined position; and
    a computer system that executes a control program that issues commands to the linear actuators to position the extendable supports and to control the compressed-air brakes to hold the extendable supports in order to generate a support structure that conforms to the surface of a work piece.

2. The automated, adjustable, machine-tool work-piece-mounting system of claim 1 wherein the automated, adjustable, machine-tool work-piece-mounting system comprises two or more automated-adjustable-machine-tool-work-piece-mounting-system modules, each automated-adjustable-machine-tool-work-piece-mounting-system module comprising:
    a substrate;
    linear actuators, which control extendable supports having non-circular and non-elliptical cross sections, mounted to the substrate to allow the extendable supports to be extended and retracted in a direction approximately normal to the substrate, the extension and retraction of the extendable supports powered by super capacitors within the linear actuators; and
    compressed-air brakes mounted above and/or below the linear actuators to hold the extendable supports in a determined position.

3. The automated, adjustable, machine-tool work-piece-mounting system of claim 1 wherein each linear actuator comprises:
    a plurality of super capacitors that power extendable-support extension and retraction;
    an electric motor connected to a planetary gearbox to drive a belt that, in turn, drives a roller shaft on which a roller is mounted, the roller applying mechanical force to the extendable support controlled by the linear actuator;
    a plurality of alignment rollers that provide positional stability for the extendable support in directions orthogonal to the direction of extendable-support extension and retraction; and
    a microprocessor-based controller that interfaces, through an electronic communications medium, to the computer system and that controls operation of the electric motor.

4. The automated, adjustable, machine-tool work-piece-mounting system of claim 1 wherein the extendable supports include adapters at a first end to interface with the work piece and are connected, at a second end, with a vacuum system to activate vacuum-operated adapters to grip the work piece.

5. The automated, adjustable, machine-tool work-piece-mounting system of claim 4 wherein the adapters are vacuum-activated suction cups.

6. The automated, adjustable, machine-tool work-piece-mounting system of claim 4 wherein each extendable support of an extendable-support pair is connected to an adapter plate, to which various tools and adapters are mounted.

7. The automated, adjustable, machine-tool work-piece-mounting system of claim 1 wherein each compressed-air brake includes two pairs of compressed-air pistons that, when compressed air is applied to the pair of compressed-air pistons, drive two wedges together to apply pressure to braking material in contact with an extendable support to hold the extendable support at a fixed position.

8. The automated, adjustable, machine-tool work-piece-mounting system of claim 1 wherein both electrical power and communications signals are together transferred through a common medium to the linear actuators.

9. The automated, adjustable, machine-tool work-piece-mounting system of claim 8 wherein the common medium is a Cat-5 Ethernet cable.

10. The automated, adjustable, machine-tool work-piece-mounting system of claim 8 wherein communications signals and power are routed through power-over-Ethernet hubs to individual linear actuators.

11. The automated, adjustable, machine-tool work-piece-mounting system of claim 1 wherein the computer system automatically positions the extendable supports so that adapters mounted to first ends of the extendable supports are positioned to conform to a work-piece surface encoded in a computer-readable description of the work piece.

12. The automated, adjustable, machine-tool work-piece-mounting system of claim 1 wherein the computer system provides a user interface that allows a user to configure and calibrate the automated, adjustable, machine-tool work-piece-mounting system, input computer-readable descriptions of the work pieces, extend and retract extendable supports, and generate a work-piece-surface-conforming support structure.

13. The automated, adjustable, machine-tool work-piece-mounting system of claim 1 wherein extendable supports are held in positions to produce a work-piece-surface-conforming support structure by compressed air and a work piece is held in position by vacuum applied through extendable supports and extendable-support adapters.

14. The automated, adjustable, machine-tool work-piece-mounting system of claim 1 wherein the automated, adjustable, machine-tool work-piece-mounting system is mounted within a rectangular cavity with embedded rails by a mounting device that includes a three-layer mounting block and a support member that is bolted from above and below to the substrate.

15. The automated, adjustable, machine-tool work-piece-mounting system of claim 14 wherein a foot mounted to the support member has a smaller size than an aperture in a middle layer of the three-layer mounting block, but has a smaller size than an aperture in a top layer of the three-layer mounting block, and is held in a fixed position within the three-layer mounting block by force from threaded bolts that, when tightened, apply a force that presses the top layer of the three-layer mounting block toward the middle layer of the three-layer mounting block.

* * * * *